United States Patent Office 3,379,161
Patented Apr. 23, 1968

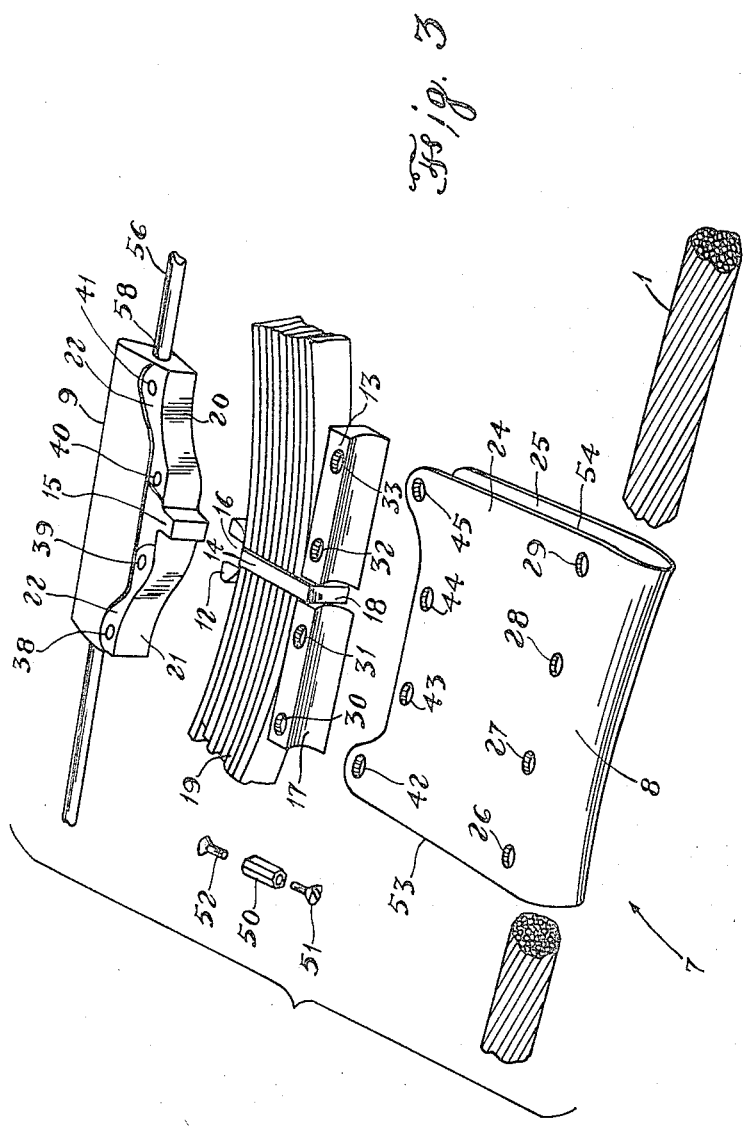

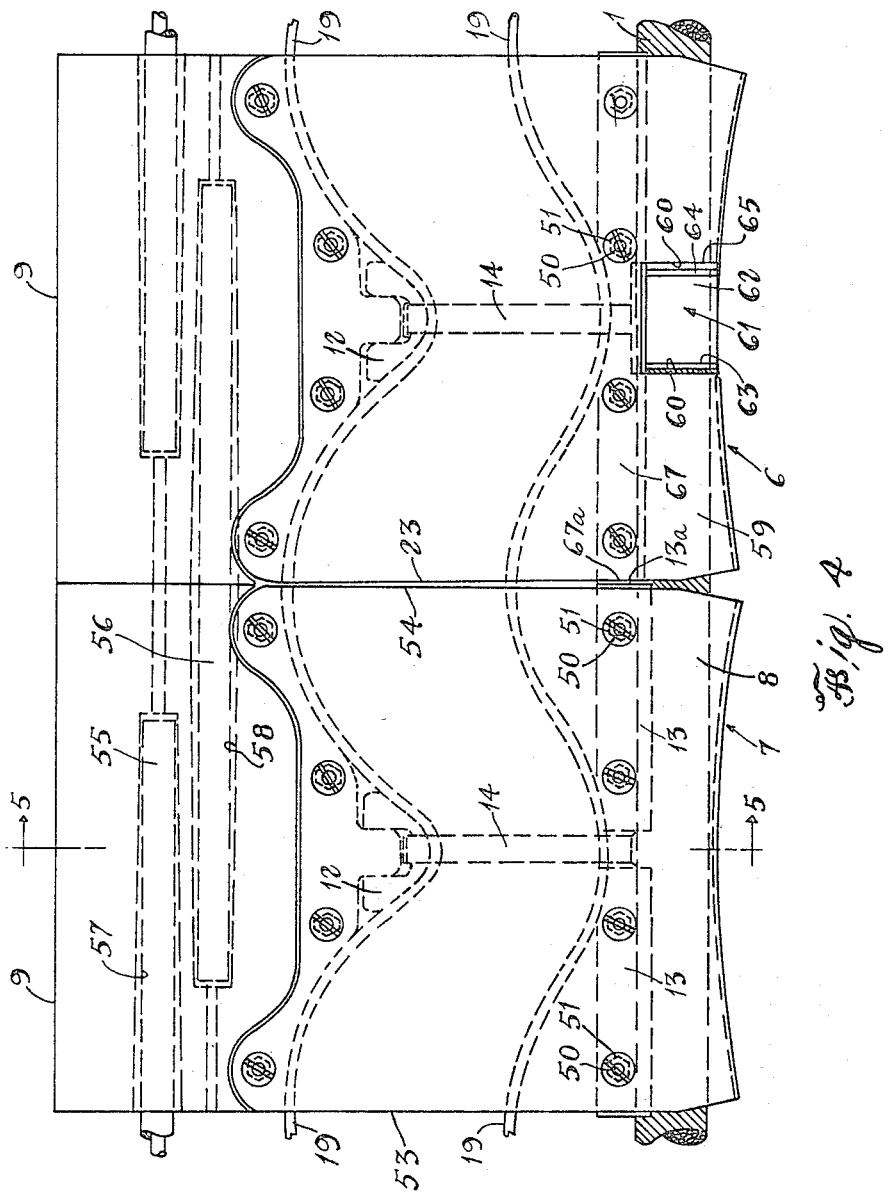

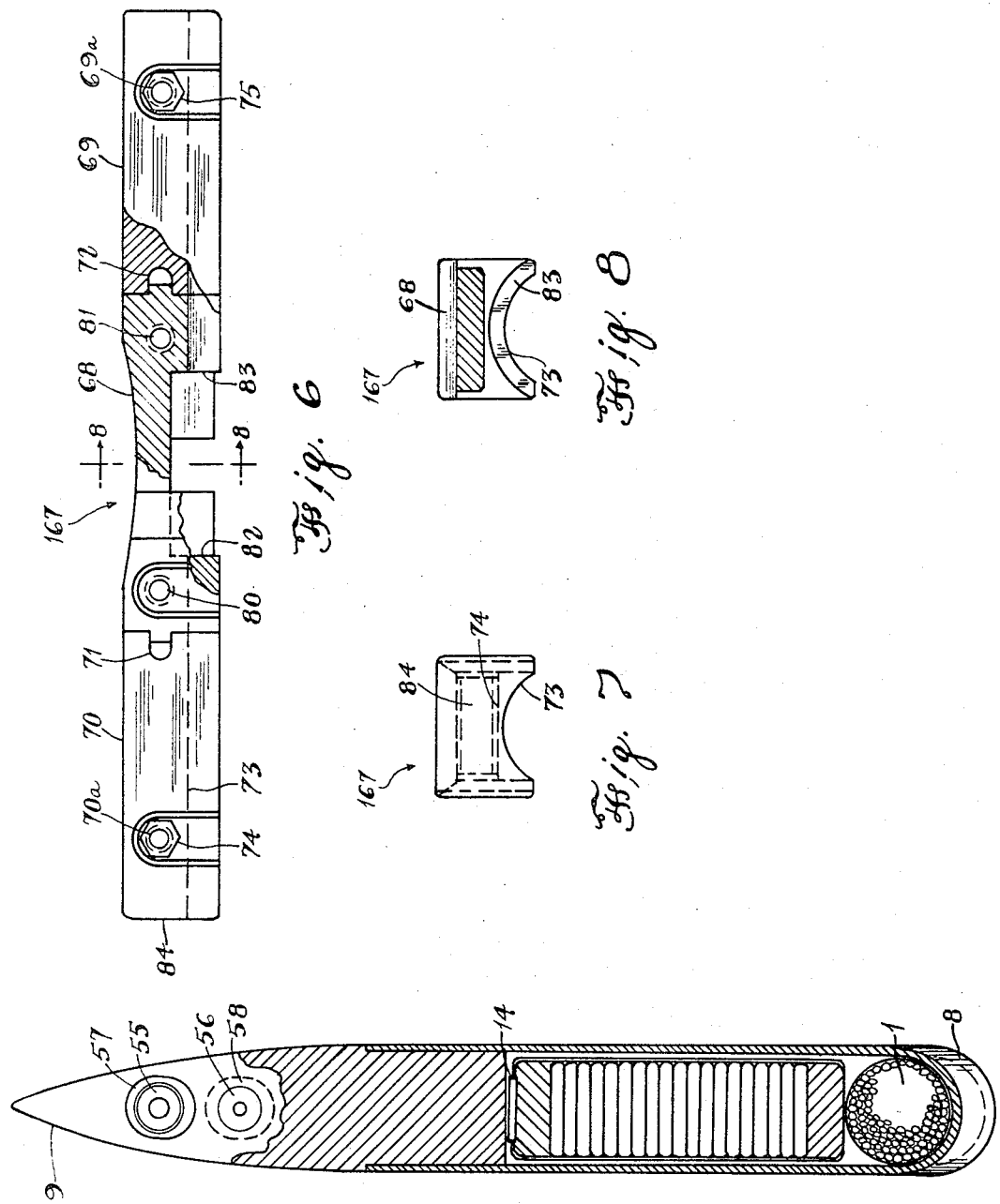

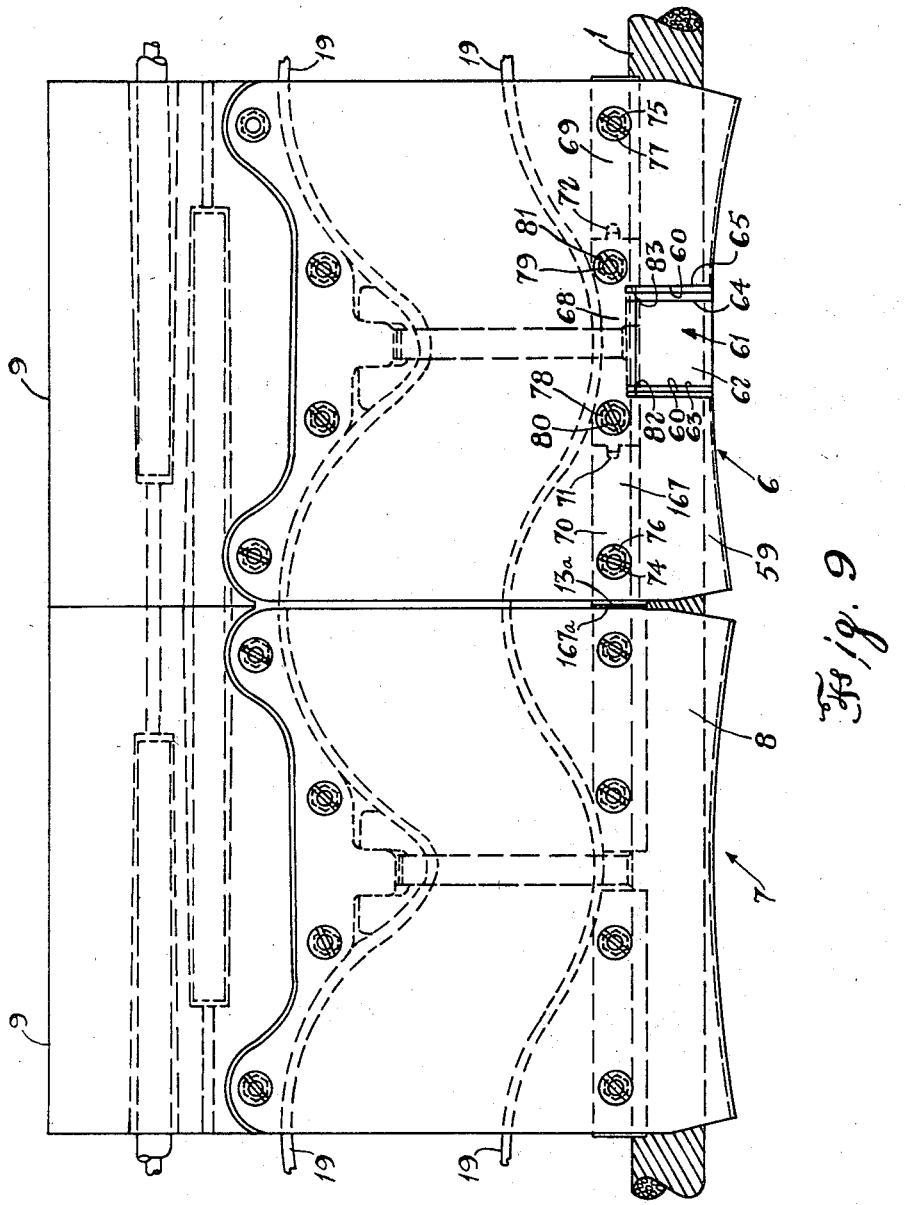

3,379,161
TOWLINES WITH MINIMUM WIDTH FAIRINGS
Donald A. Nichols, Old Lyme, and Julius O. Natwick, Niantic, Conn., assignors to the United States of America as represented by the Secretary of the Navy
Filed Aug. 31, 1966, Ser. No. 576,804
9 Claims. (Cl. 114—235)

ABSTRACT OF THE DISCLOSURE

A streamlined towline providing mechanical and electrical connection of a submerged body and a ship, comprising a strength member and electrical conductors in a streamlined fairing and fairing support rings. Fairing support rings fixed at intervals to the strength member each support a support-fairing unit, and each support-fairing unit supports a number of rider-fairing units. The rings prevent high compression loads accumulating in the fairing by transferring these loads in increments to the strength member and eliminate the need for links and stacking by preventing gaps from forming between fairing units.

The invention described herein may be manufactured and used by or for the Government of the United States of America for governmental purposes without the payment of any royalties thereon or therefor.

This invention relates to the towing of submerged objects, commonly called "fish," such as sonar devices, and particularly to an improved towline including a strength member with minimum width sectioned fairing thereon and electrical cable housed within the fairings and along the strength member. "Strength member" is a term used in the art to define the mechanical cable portion of the towline as compared to the electrical cable portion thereof, and is so used in the description following. "Sectional fairings" is a term employed to designate fairings of several inches in length as compared to continuous fairings which may be 25 feet or more in continuous length.

The term "ship" as used herein is intended to include underwater, surface or air ships. However, the invention is particularly useful in a towline connecting a "fish" and a surface ship, and the invention will be described in relation to such application.

In towing a "fish" during naval operations, it is often necessary for the ship to move at high speeds during which water resistance or drag on the strength member and the fairing sections is considerable, as is the force between adjacent fairing sections. The fairing, composed of many sections abutting end to end, prevents vibration of the strength member as the "fish" is towed at various speeds. The fairings also provide protection, both in the water, and on the ship, for electrical cables passing through the fairing sections from the ship to the towed "fish." Such towlines are required for operation of the sonar device of the "fish" from the ship.

It is a general object of the invention to provide an improved towline of the type described above.

A further object is to provide a towline incorporating the characteristics of minimum width and continuous minimum spacing of adjacent fairing sections.

Another object is to provide an improved towline having minimum interfacial friction between adjacent fairing sections under compression load therebetween to foster proper alignment of adjacent fairing sections.

A still further object is to provide an improved towline providing a minimum number of support fairing sections.

Another object of the invention is to provide an improved towline in which adjacent sections are maintained in abutting relation during payout of the cable to avoid the development of a gap between a support fairing section and the next adjacent lower group fairing section.

Other objects and advantages will appear from the following description of an embodiment of the invention, and the novel features will be particularly pointed out in connection with the appended claims.

In the accompanying drawings:

FIG. 3 is an exploded view of the fairing unit of FIG. 2 and also showing an associated section of strength member;

FIG. 4 is an elevational view of part of the towline, and illustrating two types of fairing units used in the towline and their connection to one another in a towline section;

FIG. 5 is a sectional view taken on line 5—5 of FIG. 4;

FIG. 6 is a plan view, partly in cross-section, of a three piece column assembly forming part of the support fairing sections shown in FIG. 9;

FIG. 7 is an end view of the column of FIG. 6;

FIG. 8 is an elevational view of the middle piece of the column assembly shown in FIG. 6; and FIG. 9 is an elevational view of a portion of the support fairing shown in FIG. 4 but modified to incorporate the sectional column shown in FIGS. 6, 7, and 8.

In accordance with this invention, the streamlined fairing units are pivoted on the strength member by having aligned passages in the units through and along which the strength member passes successively, and the electrical conductors, through which the ship maintains electrical communication with the towed body, are in flat ribbon form disposed in wavy shape in the same passages of the fairing units through which the strength member passes, and extend alongside the strength member. Limited fanning out between adjacent fairing units usually occurs when the strength member is flexed, as in use or when wound on a drum for storage, and slack is provided in the conductor ribbons within the passage of each fairing unit to enable such limited relative separation and approach of portions of adjacent fairing units.

Figure 1:
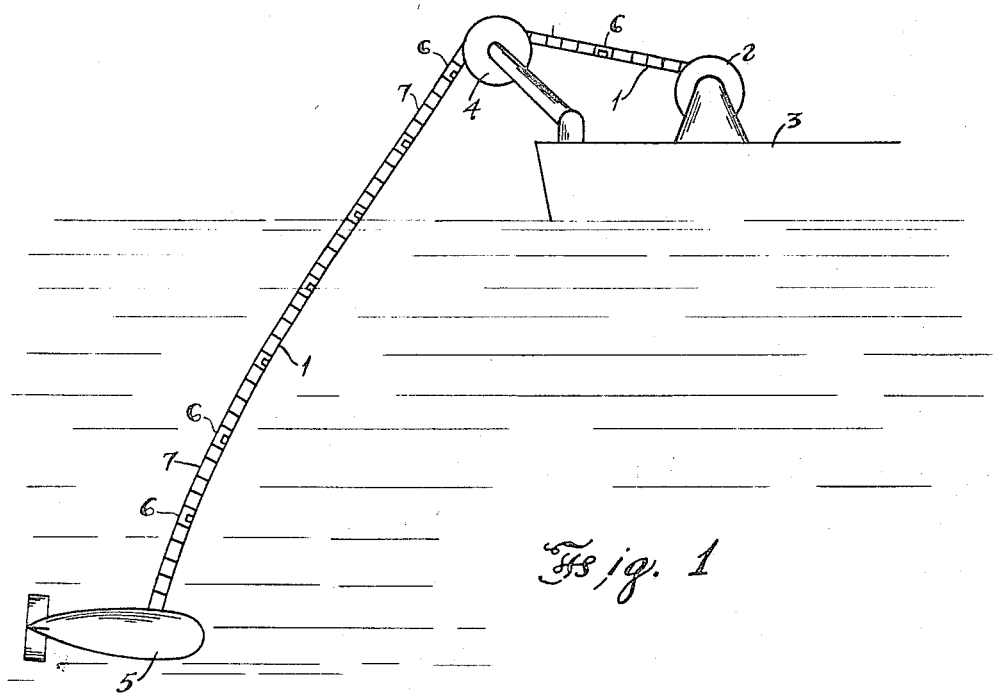
FIG. 1 is a schematic view illustrating the manner of use of a sectionally faired towline in towing a submerged object from a ship.
Figure 2:
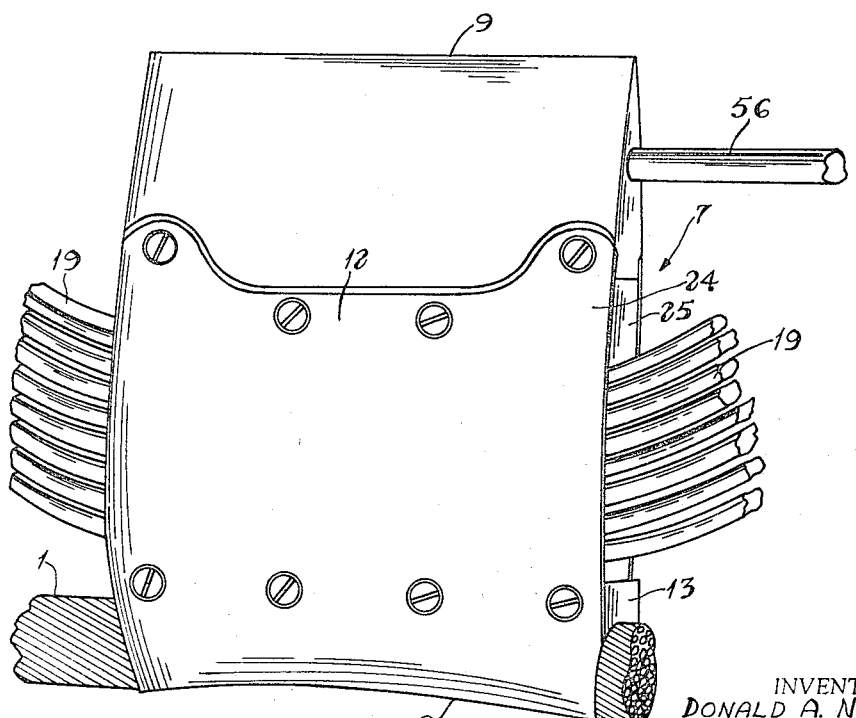
FIG. 2 is a perspective view of a portion of the towline carrying one fairing unit incorporating ribbon cable and constructed in accordance with this invention.

In the illustrated embodiment of the invention shown in FIGS. 1 to 9 inclusive, and referring initially to FIGS. 1 and 2, the usual flexible strength member passes from the drum 2 over an idler sheave 4 into the water indicated, and at its free or lower end it is pivotally attached to an object or fish 5 to be towed submerged, the fish housing a sonar device, or other equipment (not shown). When not in use, strength member 1 is wound on a hoist drum 2 on the rear part of a towing ship 3. On the strength member 1, in end to end abutting contact with one another, are a plurality of individual fairing units or sections extending from the towed object 5 to the hoist drum 2. These fairing sections comprise a plurality of support fairings indicated at 6 and spaced along the strength member 1 together with pluralities of additional rider fairing units 7, each plurality of fairing units 7 being supported by its next lower adjacent support unit 6. The strength member 1 is usually a wire rope formed of a helical wound bundle of flexible metal wires.

As shown in FIG. 3, the fairing units 7 comprise a nose piece 8, tail piece 9, a U-shaped coupling member 12, a support column member 13, and a clamping band 14. The tail piece 9 is formed with a central tongue 15 projecting in the direction of the U-shaped member 12 to be received in the groove 16 shown between the projecting leg portions of the U-shaped member 12. The support column member 13 is preferably formed of a strong low-friction plastic such as an acetal resin ("Delrin," for example), concavely curved in the face 17 thereof facing the strength member to closely follow the contour of strength member 1 adjacent to the forward portion of the support column. A central groove 18 is formed in the portion of the column 13 adjacent its face 17 to receive the metal-band clamp 14 and to bind between the U-shaped member 12 and the support column member 13 a plurality of electrical ribbon cables 19 which are provided to pass electrical current from the ship to the towed device.

To accommodate the flexing of the electrical cables 19, the tail piece 9 is formed with curved frontal surfaces 20 and 21 as indicated. Both the upper and lower side of the tail piece 9 are suitably recessed to accommodate the trailing edge portion of the nose piece and form substantially smooth flush surfaces when the tail piece is assembled in the nose piece. For example, an upper recess indicated at 22 is provided to receive the trailing edge portion of the side 24. A similar recess, not shown, is formed with the lower side of the tail piece to accommodate the nose piece side 25.

To provide for assembly of the rider fairing 7 on the strength member 1, fastener holes are formed in the tail piece 9, in both sides 24 and 25 of the channel-shaped nose piece 8 and in the column 13. Thus, in the nose piece 8 are formed apertures 26 to 29 for alignment respectively with apertures 30 to 33 in the column 13. In the tail piece 9, apertures 38 to 41 align respectively with apertures 42 to 45 in the nose piece 8. Internally threaded hexagonal prismatic inserts such as indicated at 50 are fitted into each of the fastener holes of the tail piece 9 and column 13. Pairs of flat-head screws 51 and 52 are passed through the nose piece and threaded into opposite ends of each insert 50 to secure the fairing in assembled condition as shown in FIG. 2.

It is also to be noted that the electric cables are rigidly supported both on the column 13 and on the tail piece 9 and that both the tail piece and column are supported in spaced relation in the nose piece. This arrangement provides an exceptionally rigid, compact, reliable fairing and yet provides the required flexibility for bend of the strength member while at the same time providing continuous protection for the electrical cables.

It is to be noted further as shown in FIG. 4, that the column 13 and tail piece 9 are dimensioned to extend slightly beyond the side edges 53 and 54 of the nose piece 8 such that the compression load between adjacent fairings is usually supported solely through the column 13, and the edges of adjacent fairings are usually maintained in spaced relation solely by the columns 13. This feature of applicants' invention is particularly desirable because it provides a reliable means for absorbing force, promotes minimum friction between adjacent fairings and attains minimum space between fairing units.

As shown in FIGS. 3 and 4, aligning rods 55 and 56 are provided in each tail piece 9 in staggered recesses 57 and 58 to maintain adjacent fairings in pivotal alignment. This feature was disclosed in U.S. Patent No. 3,176,646 and is not per se a part of the subject invention.

Referring to FIGS. 1 and 4, the support fairing 6 is the same in construction as described for unit 7 except that the unit 6 is provided with means for pivotally fixing the unit to the strength member such that each support unit 6 can support a plurality of the units 7 located between it and the next support fairing nearer to the ship. Thus, as shown in FIG. 4, the nose piece 59 of the unit 6 is notched in its front face as at 60 to straddle a pivot connecting fixture generally indicated at 61. Fixture 61 comprises a sleeve, commonly referred to as a support ring 62, which is fixed to the strength member 1 by any suitable means such as welding or cementing and suitable thrust bearing means such as thrust washers 63, 64, and 65. The fixture 61 transfers thrust load from the support fairing 6 to the strength member 1 while permitting all fairing sections 6 and 7 to pivot.

The support fairing 6 is provided with a support column indicated at 67 which has an end 67a which bears against the adjacent end 13a of column 13 of fairing 7. The columns 67 and 13 and tail pieces 9 extend beyond the edges 23 and 54 of the nose pieces 59 and 8 sufficiently to prevent adjacent nose pieces from touching each other under all conditions of use in order to prevent mutual damage occurring to the nose pieces and to reduce friction between adjacent fairings under compression load. As in the case of nose piece 8, the nose piece 59 is secured to the column 67 and to its associated tail piece 9 through hexagonal shaped internally threaded inserts 50 and associated screws 51 and 52 shown in FIGS. 3 and 4.

In a support fairing as thus far described, the weight of group fairings 7 and the portion of the electrical cable associated therewith is supported on the support ring 62 of its associated support fairing 6 through the medium of the nose piece 59 and the screws 51–52 attaching the column 67 to the nose piece. In accordance with another aspect of the subject invention, the column member may be modified to take a part or all of the load transfer function by forming a suitable bearing surface thereon and thus partially or completely eliminate the nose piece and screws from load transfer function. Thus, as shown in FIGS. 6, 7, 8 and 9, a support column 167 is formed of a middle metal section 68 and two adjacent plastic end sections 69 and 70 connected to the middle section by tongue and groove joints 71 and 72. The forward face 73 of the column 167 is concavely curved to substantially follow the curvature of the strength member 1. The sections 68, 69, and 70 are secured to the nose piece 59 by suitable fastenings including hexagonal-shaped threaded inserts 74 and 75 passed through hexagonal apertures 70a and 69a in the sections 70 and 69 and screws 76 and 77 passing through the nose piece 59 and threaded into the inserts 74 and 75. In the case of the middle metal section, screws 78 and 79 are threaded into threaded holes 80 and 81 formed in the middle metal section. As shown in FIGS. 6 and 9, the middle section 68 is recessed to form radial shoulders 82 and 83 which form bearing surfaces for thrust washers 63 and 65. Thus, the thrust load of the fairing 6 is transferred through bearing surface 83 and thrust washers 65 and 64 to the ring 62 fixed to the strength member 1. It is to be noted that the column 167 serves the function of transferring thrust from the fairing 6 to the fixed ring 62 through bearing surface 83 and the thrust washers 64 and 65 and also serves the function of supporting the adjacent fairings thereabove by engagement of its free end opposite to 167a with the adjacent end of the column 13 of the next adjacent fairing 7 above (not shown).

The advantage of sectionalizing the column 167 is to provide a metal thrust bearing surface while at the same time minimizing weight of the column 167. Minimum weight is desirable to keep the center of gravity of fairing 6 as far forward as possible, i.e., as close to the pivot axis of the fairing as possible to avoid flutter and kiting of the fairing unit and to more effectively use the force of water to keep the fairing in proper alignment.

The middle section 68 of the column 167 is preferably made of stainless steel to provide strength and resistance to water corrosion. The added strength in the section 68 permits the support of a greater number of associated fairing sections 7. It is to be understood, however, that the column 167 can be of one integral piece of plastic such as column 67 and with bearing surfaces such as 82 and 83 formed therein if the required support load is lessened by the support of fewer fairings 7. As shown in FIG. 9, the column bearing surface 83 and nose piece edge 60 are in alignment such that thrust load is partially transferred through column surface 83 and partially through the nose piece and its securing screws. To obtain complete load transfer through the column surface 83, the nose piece recess may be made slightly wider.

The electrical ribbon cables 19 used for the fairing units 6 and 7 described above are each rectangular in cross-section and grouped together in substantially sinusoidal form through the successive fairings, as shown in FIGS. 4 and 9. The cables are secured in each unit by the clamping means described hereinbefore such that there is obtained an excess length of electrical cables between adjacent fairing units and the weight of the electrical cables is spread over the multitude of supporting fairing units. It is to be understood that although the invention is described herein in conjunction with ribbon cables, it is also suitable to the incorporation of stretchable electric cables. In the latter case the cables are supported as described hereinbefore, but the sinusoidal positioning of the cables is not required since the stretch in the cables provide for spread action of the fairing units.

From the above it should be evident that the subject invention provides each of the advantages and improvements mentioned hereinbefore. In addition, it should be noted that the combination and arrangement of load transfer support columns and spaced support rings provide an important advantage of reducing the number of support rings and support fairings required to avoid undesirable spacing of fairings along the strength member which would expose the electrical cables to water drag and mechanical damage.

In the conventional lost motion connection type fairings, as discussed in U.S. Patent No. 3,194,204, as the towline is fed into the water from the towpoint sheave each successive fairing preceding a supported fairing slides downward on the strength member a greater distance than the previous fairing such that the uppermost fairing of a supported group of fairings becomes considerably spaced from the adjacent supported fairing next closer to the towpoint on the ship. To minimize this difficulty, the present conventional practice is to increase the number of support ring fairings. This expediency is costly in the production of towline and unless carried to an extreme does not satisfactorily eliminate the difficulty.

In contrast a towline in accordance with the subject invention provides substantially no lost motion, the spacing being governed by the compression load columns, and the column ends remain essentially in contact wherever the cable is straight or nearly straight.

It is also to be noted that when towline is fed from the drum over the towpoint sheave in the direction of the water, the drum and sheave produce a staggered fairing which is not an ideal orientation for minimum water drag and avoidance of kiting. In applicant's towline reduction of interfairing friction by use of the support columns enables the towline fairings to reorient themselves to provide minimum drag and kiting in passing through the turbulent wake of the ship's propulsion system such that the fairings become properly aligned.

It will be understood that various changes in the details, materials, and arrangements of parts, which have been herein described and illustrated in order to explain the nature of the invention, may be made by those skilled in the art within the principle and scope of the invention as expressed in the appended claims.

We claim:
1. A towline with fairings thereon by which a submerged object may be towed from a ship comprising:
   a flexible strength member,
   a plurality of electrical cables,
   a plurality of fairing units including support fairing units and rider fairing units each having a channel-shaped nose piece with side edges, a tail piece having an edge portion received in and closing the open face of the channel and a support column positioned in said nose piece to define a passage adjacent the closed end of said channel for pivotally mounting said fairings on said strength member and a passage between said tail piece and said column for passing said electrical cables,
   means securing each column to its associated nose piece,
   clamping means for securing said electrical cables to each of said fairing units,
   each of said columns being slightly longer than the distance between opposite side edes of said nose pieces to stack said fairings on said strength member with adjacent column ends inabutment and support fairing unit between adjacent groups of rider fairing units, and
   means for pivotally securing said support fairings to said strength member in spaced relation therealong to support on each of said support fairings one or more of the rider fairings.
2. A towline according to claim 1,
   said strength member having a curved periphery,
   each of said columns having a front face concavely curved to follow the curvature of the adjacent portion of said strength member.
3. A towline according to claim 1,
   each of said nose pieces of said support fairings being slotted normal to said strength-defining spaced parallel edges,
   each of said pivotal securing means for said support fairings including a support ring fixed to said strength member between said nose piece slot edges and a thrust washer mounted on said strength member to transfer fairing load force through said nose piece to said support ring.
4. A towline according to claim 1,
   each of said support fairing support columns being slotted to provide a thrust load bearing shoulder,
   said pivotal securing means for each of said support fairings including a support ring fixed to said strength member and thrust load means for transferring thrust load from said rider fairings through said support column bearing shoulder to said support ring.
5. A towline according to claim 1,
   said electrical cable clamping means including a tongue formed on said tail piece adjacent one side of said electrical cables, a U-shaped member for receiving said tail piece tongue, and a clamp band for securing said electrical cables between and to said U-shaped member and said support column, such that said cables are supported on both said tail piece and said support column.
6. A towline according to claim 2,
   each of said nose pieces of said support fairings being slotted normal to said strength-defining spaced parallel edges,
   each of said pivotal securing means for said support fairings including a support ring fixed to said strength member between said nose piece slot edges and a thrust washer mounted on said strength member to transfer fairing load force through said nose piece to said support ring.
7. A towline according to claim 2,
   each of said support fairing support columns being slotted to provide a thrust load bearing shoulder, said pivotal securing means for each of said support fairings including a support ring fixed to said strength member and thrust load means for transferring thrust load from said rider fairings through said support column bearing shoulder to said support ring.

8. A towline according to claim 6,
said electrical cable clamping means including a tongue formed on said tail piece adjacent one side of said electrical cables, a U-shaped member for receiving said tail piece tongue, and a clamp band for securing said electrical cables between and to said U-shaped member and said support column, such that said cables are supported on both said tail piece and said support column.

9. A towline according to claim 7,
said electrical cable clamping means including a tongue formed on said tail piece adjacent one side of said electrical cables, a U-shaped member for receiving said tail piece tongue, and a clamp band for securing said electrical cables between and to said U-shaped member and said support column, such that said cables are supported on both said tail piece and said support column.

References Cited
UNITED STATES PATENTS

| | | | |
|---|---|---|---|
| 3,176,646 | 4/1965 | Natwick et al. | 114—235 |
| 3,241,513 | 3/1966 | Rather et al. | 114—235 |

MILTON BUCHLER, *Primary Examiner.*

T. M. BLIX, *Assistant Examiner.*